(12) United States Patent
Aga et al.

(10) Patent No.: US 9,740,888 B1
(45) Date of Patent: Aug. 22, 2017

(54) TAMPER EVIDENT DETECTION

(71) Applicant: Seagate Technology LLC, Cupertino, CA (US)

(72) Inventors: Meherzad Firoze Aga, Singapore (SG); Syed Yasir Abbas, Singapore (SG); Wajid Ali, Singapore (SG); William Erik Anderson, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/175,473

(22) Filed: Feb. 7, 2014

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)
*G06F 21/86* (2013.01)

(52) U.S. Cl.
CPC ..................... *G06F 21/86* (2013.01)

(58) Field of Classification Search
CPC ....................................... G06F 21/86
USPC ........................................... 726/34
See application file for complete search history.

(56) References Cited

U.S. PATENT DOCUMENTS

| | | | |
|---|---|---|---|
| 5,027,397 A | 6/1991 | Double | |
| 5,991,164 A | 11/1999 | Saito et al. | |
| 6,240,517 B1 | 5/2001 | Nishioka | |
| 6,888,502 B2 | 5/2005 | Beigel et al. | |
| 6,957,345 B2 | 10/2005 | Cesana | |
| 7,065,656 B2 | 6/2006 | Schwenck | |
| 7,098,792 B1 | 8/2006 | Ahlf et al. | |
| 7,259,357 B2 | 8/2007 | Walker | |
| 7,296,299 B2 * | 11/2007 | Schwenck et al. | 726/34 |
| 7,493,690 B2 | 2/2009 | Muto et al. | |
| 7,535,356 B2 | 5/2009 | Lerch et al. | |
| 8,499,169 B2 | 7/2013 | Beverly | |
| 2006/0005996 A1 | 1/2006 | Muto et al. | |
| 2008/0112596 A1* | 5/2008 | Rhoads et al. | 382/115 |
| 2008/0191174 A1 | 8/2008 | Ehrensvard et al. | |
| 2009/0060194 A1* | 3/2009 | Mackey et al. | 380/277 |
| 2009/0212945 A1 | 8/2009 | Steen | |
| 2010/0290200 A1 | 11/2010 | Yamamoto et al. | |
| 2010/0321032 A1* | 12/2010 | Holce | G01R 31/343 324/601 |

(Continued)

OTHER PUBLICATIONS

Verbitskiy, "Key extraction from general non-discrete signals", Sep. 2008 http://eprint.iacr.org/2009/303.pdf.

(Continued)

*Primary Examiner* — Taghi Arani
*Assistant Examiner* — Khalil Naghdali
(74) *Attorney, Agent, or Firm* — Cesari & Reed, LLP; Kirk A. Cesari; Logan Brown

(57) ABSTRACT

Systems or methods can be used to detect evidence of tampering. The tampering can be physical tampering, such as the turning of a screw, or removal or modification of an electronic component. In some examples, a tamper detection value can be determined from a tamper detection device and compared to a predetermined tamper detection value to determine if tampering is indicated. The system can, upon detection of the tampering, halt an operation, disable device or circuit functionality, disable future operations, physically disable a device, or any combination thereof.

17 Claims, 5 Drawing Sheets

(56) References Cited

U.S. PATENT DOCUMENTS

| | | | |
|---|---|---|---|
| 2011/0031985 A1* | 2/2011 | Johnson | 324/681 |
| 2012/0032834 A1* | 2/2012 | Weeks | 342/118 |
| 2012/0254589 A1* | 10/2012 | Corbal San Adrian et al. | 712/204 |
| 2013/0174265 A1* | 7/2013 | Chan et al. | 726/26 |
| 2014/0108786 A1* | 4/2014 | Kreft | 713/156 |

OTHER PUBLICATIONS

Kang, "The Implementation of Fuzzy Extractor is Not Hard to Do: An Approach Using PUF Data", Jan. 2013 http://www.dvlsi.jst.go.jp/list/SCIS2013/pdf/SCIS2013_2E1-5.pdf.

Dodis, "Fuzzy Extractors: How to Generate Strong Keys from Biometrics and Other Noisy Data", Jan. 20, 2008 http://www.cs.ucla.edu/~rafail/PUBLIC/89.pdf.

* cited by examiner

TAMPER EVIDENT DETECTION

SUMMARY

In some embodiments, an apparatus can comprise a tamper detection device (TDD), a circuit configured to determine a tamper value from the tamper detection device and coupled to the tamper detection device. Further, the circuit can disable a function of the apparatus based on the tamper value.

In some embodiments, a system can comprise at least one tamper detection device (TDD) having a preset value, and configured to change tamper value when tampered with, and a processor coupled to the at least one tamper detection device configured to compare the tamper values of the at least one tamper detection devices to a preset value stored in a first memory.

In some embodiments, a method can comprise determining one or more tamper values corresponding to each of one or more tamper detection devices (TDDs), and disabling a function of a device corresponding to the TDDs based on the one or more tamper values.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as circuitry, logic circuits, software running on a computer processor or controller, or any combination thereof. The devices, methods, and functions described herein may be implemented via a controller or dedicated hardware implementations including, but not limited to, application specific integrated circuits, programmable logic arrays, or other hardware devices. Further, the methods described herein may be implemented as a computer readable storage medium or memory device including instructions that when executed cause a processor to perform the methods or functions.

Tampering of a device may be done by unauthorized individuals, companies, governments, or other entities, to retrieve information from the device without the permission of the owner. In some circumstances, devices may be physically tampered with (e.g. covers removed, hardware removed or changed, new components added, etc.), which may allow an unauthorized person to have access to proprietary or secure information such as communications, hardware designs, software, or data. For example, mobile phones can be taken apart to determine the design, a list of components, or the manufacturing techniques used in making the phone. For these and other reasons, a device owner may wish to protect the device from physical tampering.

Figure 1:
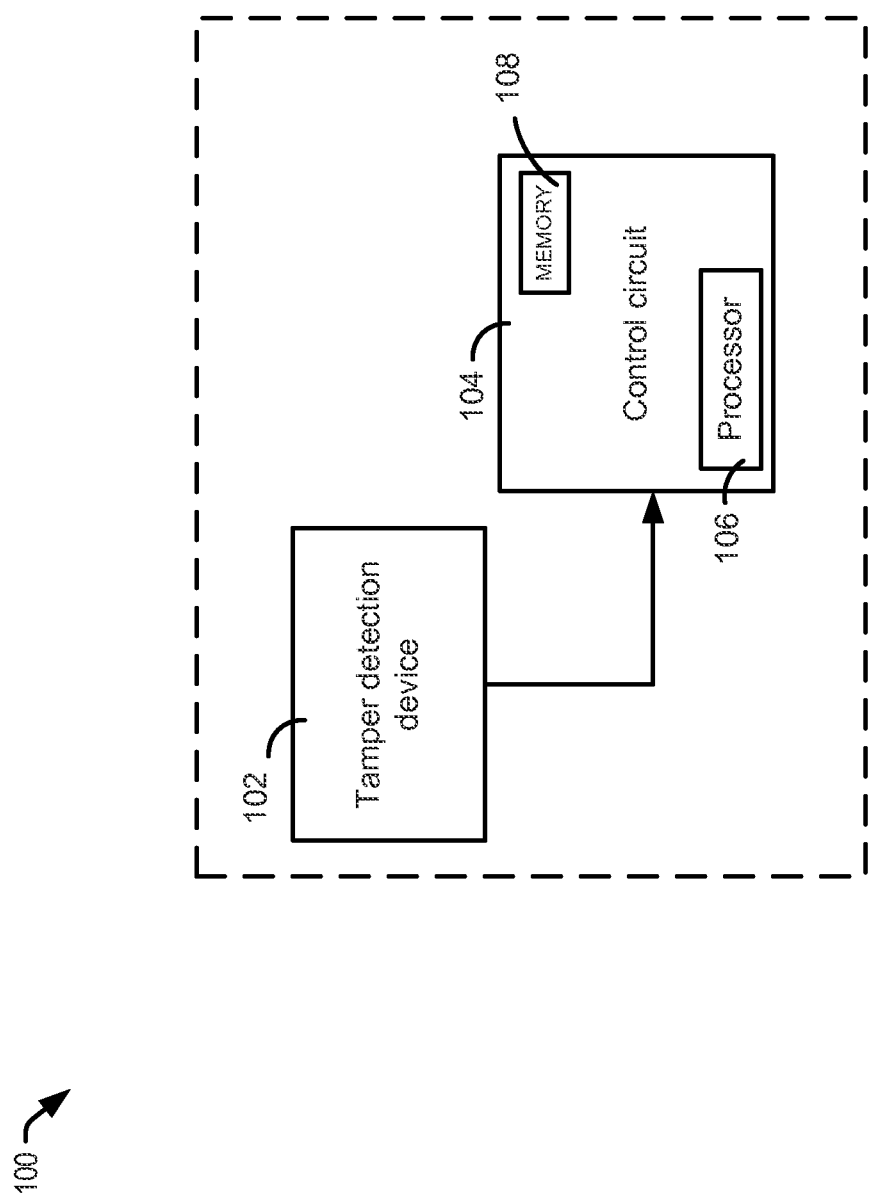
FIG. 1 is a system of tamper evident detection, in accordance with certain embodiments of the present disclosure.

Referring to FIG. 1, a system of tamper evident detection is shown and is generally designated 100. The system 100 can have a tamper detection device 102 coupled to a control circuit 104, which can include a processor 106 and a memory 108. The control circuit 104 may be a standalone circuit, a system on chip (SOC), a controller, or integrated into other circuits. The control circuit 104 may also include other components, such as converter circuits (e.g. data converter circuits), registers, firmware, and so forth.

The tamper detection device (TDD) 102 can detect a tamper event, such as a removal, or attempted removal, of one component from another. The TDD 102 may include one or more sensors or other physical components that provide one or more indicators of a tamper event of a device. The indicator(s) may include a digital indicator or analog signal indicator that can be analyzed to determine whether a tamper event has occurred. The TDD 102 can derive a tamper value from the indicator(s), representing whether or not a tamper event is believed to have occurred, which may be done by comparing the tamper value to a preset tamper value or a threshold tamper value. The preset tamper value(s) or the threshold tamper value(s) can be set at a previous point in time, such as during manufacturing, and may be stored in the memory 108; the memory 108 can be solid state memory, disc memory, or any other memory; the memory 108 may be volatile memory or nonvolatile memory. The TDD 102 can have one or multiple tamper values, any of which can include a range of tamper values, such as one byte (0 to 255), six bits (0 to 63), three hex (0 to 4095), or other range of values.

During a tamper event, the tamper value corresponding to the TDD 102 may change based on a hardware determination, an electrical determination, a software determination, or any combination thereof. In some embodiments, the tamper value can correspond to a resistance or voltage, which can be digitized (e.g. via an analog to digital converter) and stored in a memory, such as a register. When a tamper event occurs, a resistance can change, and a new value can be digitized and stored in a memory. In an example, the TDD 102 can be a fastener, such as a screw, securing the PCB to the frame, and may be configured to change the tamper value when the TDD 102 detects the removal of a printed circuit board (PCB) from a frame (e.g. a chassis, shell, etc.), or the removal of one PCB from another PCB. When the screw or fastener is removed or turned, an electrical resistance can change, which can be an indication of tampering as discussed below. In other examples, the TDD 102 tamper value may change as a result of changes in the electrical properties of electronic components, such as changes in the resistance of conductive traces on a PCB due to cutting or rerouting, or changes in capacitance when components are altered or replaced. In another example, the TDD 102 can be configured to detect changes in a magnetic field, which may occur when inductive components are replaced or altered, or when components that are magnetically secured are partially or fully removed. In yet another example, the TDD 102 can be configured to measure signal integrity, thermal changes, and so forth. The TDD 102 can generate data (e.g. analog signals, digital signals, etc.), which can include (or be processed to include) the tamper value to the control circuit 104; the tamper value can be provided continuously, periodically, at predetermined times, after a event (e.g. startup), or at other times.

The control circuit 104 can receive the tamper value from the TDD 102 and compare it to a preset tamper value, which may be stored in the memory 108. The memory 108 can include preset tamper values corresponding to each TDD, a preset tamper value corresponding to all of the TDDs, or any combination thereof. When the tamper value(s) provided by the TDD(s) 102 do not match the preset value(s) stored in the memory 108, the control circuit 104 may, via the processor or another circuit, halt a current process or function, and can prevent future operations or functions. The control circuit 104 may also store a log of the details (e.g. the time of the tamper, the nature of the tamper, components involved, etc.) in the memory 108 for later access, and generate an error indicator to a user (e.g. a light indicator, display panel, or GUI) or another system coupled to the system 100.

The system 100 may be used in devices seeking to detect hardware tampering. For example, the system 100 may be used in mobile electronics (e.g. cell phones, tablets, blue tooth devices, etc.), in data storage systems (e.g. hard disk drives, flash devices, etc.), or in computing devices, such as laptops, servers, routers, and so forth. In addition, the system 100 can be adapted to work with recording devices (e.g. police dash cams, airplane "black boxes", etc.), as well as with government, industrial, or other applications.

Figure 2:
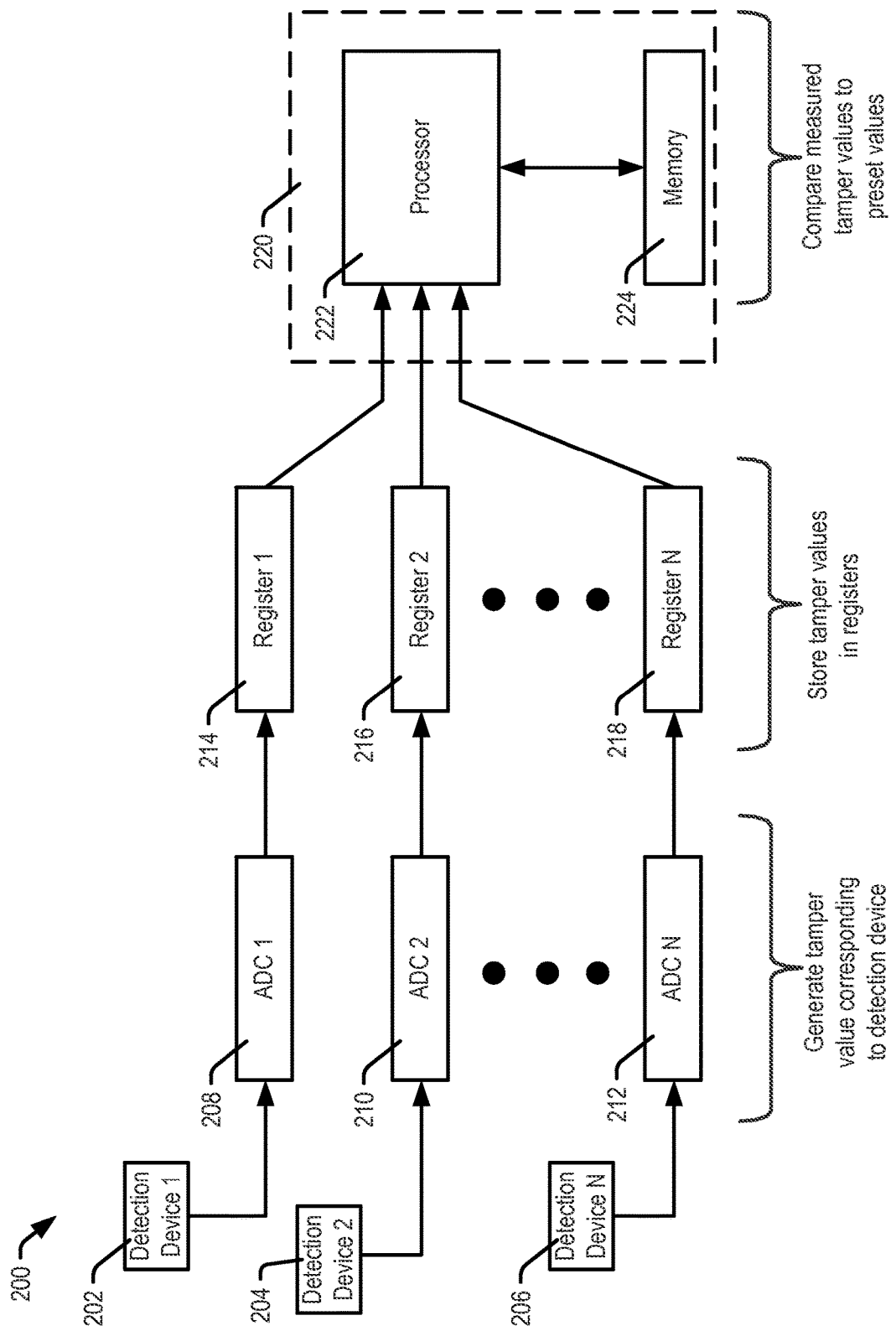
FIG. 2 is a system of tamper evident detection, in accordance with certain embodiments of the present disclosure.

Referring to FIG. 2, a system of tamper evident detection is shown and is generally designated 200. The system 200 may be example embodiments of the system 100. The system 200 can have a control circuit 220, which may include a processor 222 coupled to a memory 224, which may be coupled to a first register 214. The first register 214 may be coupled to a converter 208, and a TDD 202. The TDD 202 may provide a tamper indicating value in an analog or digital format, via circuit connections, data buses (e.g. serial or parallel), or by other means. When the tamper indicating value is in an analog format, it may be digitized by a converter 208, such as an analog to digital converter (ADC), to be analyzed by the control circuit 220. For example, a TDD may provide the tamper value via a direct-current (DC) voltage, which can increase or decrease in amplitude depending on the nature of a tamper or sensor. An ADC can convert a DC voltage to a digital value that may be stored and analyzed by the control circuit 220; in some embodiments, the control circuit 220 can include hardware circuits, processors, memory, firmware, software, or any combination thereof. The TDD 202 can provide the tamper value to the control circuit 220 via a bus based on a communications protocol such as an Inter-Integrated Circuit ($I^2C$) protocol. Also, transmitters/receivers or encoders/decoders may be used in addition to, or in place of, the converter 208.

Tamper values may be stored in a memory device, such as a register, before being provided to the processor 222. In some embodiments, the registers may be included in the control circuit 220. A first register 214 may receive the tamper value from the converter 208 (or from other components or directly from the TDD 202), and can store it until requested by the control circuit 220. When the control circuit 220 receives the tamper value from first register 214, it may compare the tamper value to the preset tamper value stored in the memory 224 via the processor 222, firmware, software, or other means.

In some embodiments, a system may check for evidence of tampering with more than one detection device. Placing detection devices in more than one location, such as at different points of contact between a PCB and a chassis, may result in better tamper detection. Different types of detection devices can be used in combination, such as a capacitance detector and a contact detector, as there can be more than one way to tamper with a system. For example, a would-be tamperer may desire to determine the characteristics of a component, such as a capacitor, but may not need to remove the PCB from the chassis to get access; a capacitance detector may detect evidence of tampering, but a detector configured to measure resistance of a PCB to chassis connection point may not detect the tampering.

The system 200 can include a first TDD 202, a second TDD 204, up to and including TDD N 206; in some embodiments, however, the system may include just one TDD. Tamper detection devices 202, 204, and 206 may be the same or similar to each other, or may be different. For example, the first TDD 202 and TDD N 204 can be configured to measure changes in resistance, while the second TDD 204 may be configured to measure capacitance. In addition, other TDDs (not shown) may be configured to measure magnetic fields, voltage, current, signal fidelity, thermal changes, and so forth.

For some embodiments, each TDD may be coupled to a corresponding converter and memory device, such as a register. For example, the first TDD 202 can be coupled to the first ADC 208 and first register 214. The second TDD 204 may be coupled to the second ADC 210 and second register 216, and TDD N 206 can be coupled to ADC N 212 and register N 218. In some instances, a TDD may be coupled to a transceiver or an encoder/decoder rather than, or in addition to, a converter.

The system 200 may include a separate converter and register for each TDD. In some examples, components, including converters and memory, may be shared by more than one TDD. For example, a data converter can have multiple channels, and a memory can have a plurality of registers. The TDDs, converters, memory (e.g. registers), and the control circuit 220 may be standalone, part of an SOC, or integrated into other circuits.

The TDD 202 values can be combined together and compared with a tamper value stored in the memory 224. In some examples, the tamper values of the TDDs 202, 204, and 206, can be combined (e.g. concatenated) by shifting the tamper value stored in a first register 214 by a product of the number of storage bits (N) in the first TDD 202 and the number (T) of remaining unshifted tamper values, inclusive. The number of bits a tamper value may be shifted can be represented by the following equation: $Shift = N \times (T-1)$. For example, in a four TDD system where each TDD tamper value is four bits long, the first shift can be shifted by 12 bits, the second tamper value can be shifted by eight bits, the third tamper value may be shifted by four bits, and the last value may not be shifted. The combined value may be encrypted, or hashed using a hashing function. A hash function can encode input data by combining the data with a key. For example, a hash function can combine a key value with the input data, and can return a fixed-size bit string. The hash function can produce repeatable outcomes; when the input data remains the same, the bit string will not change. When the input data changes, however, the fixed-size bit string may change. The hashing function can protect the confidentiality of the input data by preventing the calculation of the input data based on the encoded data.

Figure 3:
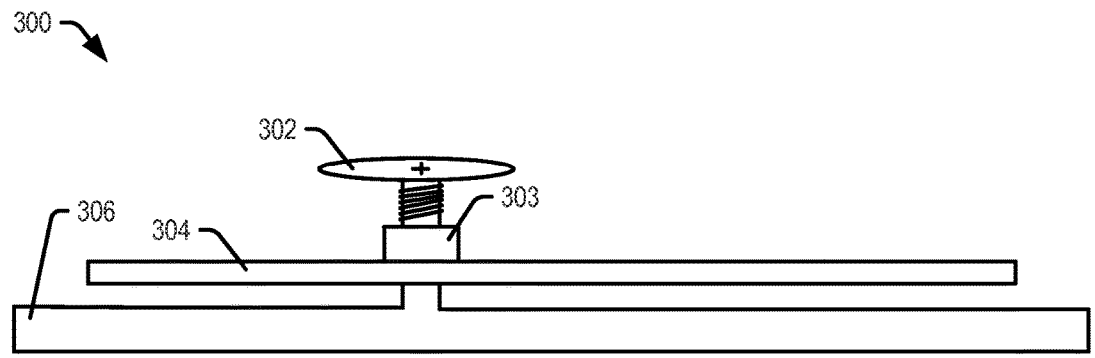
FIG. 3 is a system of tamper evident detection, in accordance with certain embodiments of the present disclosure.

Referring to FIG. 3, a system of tamper evident detection is shown and is generally designated 300. The system 300 may be an example embodiment of systems 100 and 200. The system 300 can include a screw 302, coupled to a tamper detection device (TDD) 303. The system 300 can also include a printed circuit board (PCB) 304 coupled to the TDD 303, and mechanically affixed to a frame (e.g. chassis) 306.

In some embodiments, the TDD 303 can be an adjustable variable resistor configured to change resistance when the screw 302 is turned. For example, the resistance of the TDD 303 may increase when the screw 302 is turned clockwise, and may decrease when the screw 302 is rotated counter clockwise. The TDD 303 may also include a measurement circuit (e.g. voltmeter, ohmmeter, etc.) for detecting the resistance value and providing it to a converter (not shown), although the measurement circuit may be a separate circuit and not integrated into the TDD 303.

The screw 302 can also secure the PCB 304 or another device (including perforated boards, etched copper boards, and so forth) to the frame 306. The frame 306 may be a chassis, another PCB, a shell, or any other hardware to which the PCB 304 may be affixed. Furthermore, the system 300 may be included in a mobile device, such as a cell phone or smart phone, in data storage devices, or in other applications.

Figure 4:
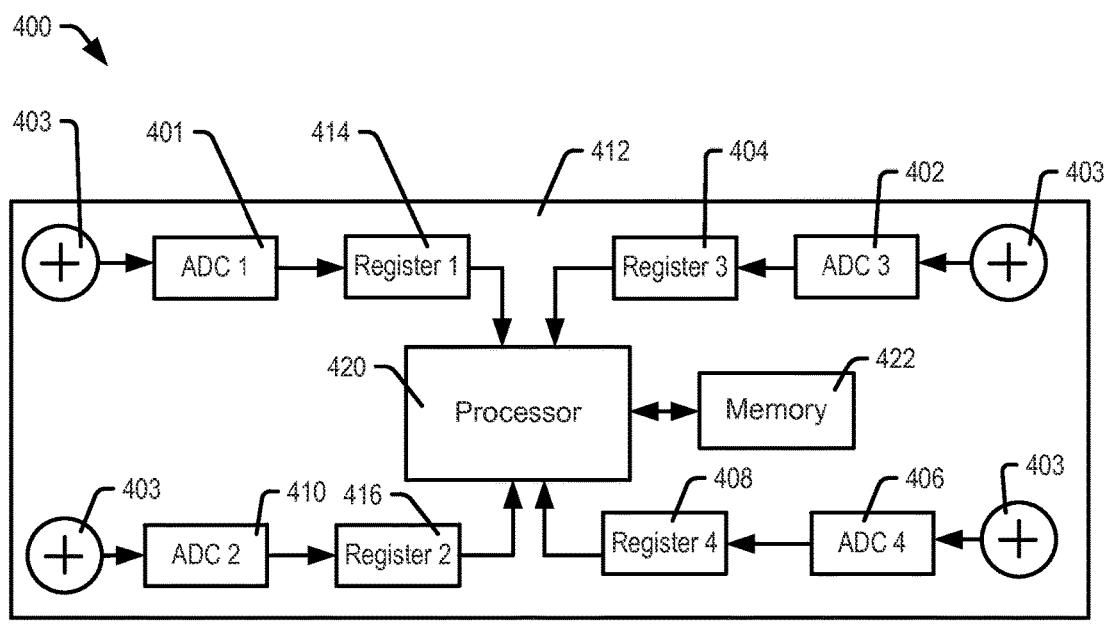
FIG. 4 is a system of tamper evident detection, in accordance with certain embodiments of the present disclosure.

Referring to FIG. 4, a system of tamper evident detection is shown and is generally designated 400. The system 400 can be an embodiment of systems 100, 200, and 300. For example, each TDD 403 may have a separate corresponding ADC and memory register, or multiple TDDs 403 can share such circuits. The TDDs 403 can be coupled to a corresponding converter circuit (e.g. the first ADC 401, the second ADC 410, the third ADC 402, and the fourth ADC 406) and first register 414, second register 416, third register 404, and a fourth register 408, respectively. A first register 414, second register 416, third register 404, and fourth register 408, may be coupled to the processor 420, which in turn may be coupled to the memory 422.

The TDDs 403, which may be variable resistors, such as a screw configured to secure the PCB 412 to a chassis (as described in FIG. 3). After the screws are tightened to a preset value (e.g. torque value) or position (e.g. during manufacturing), the resistance of each of the TDDs 403 can be determined, converted to a digital format by the converter circuits (e.g. the first ADC 401, the second ADC 410, the third ADC 402, and the fourth ADC 406), and stored in a memory device, such as a first register 414, a second register, 416, a third register 404, and a fourth register 408. The TDDs 403 can provide tamper values which may be compared to preset tamper values stored in the memory 422; when the values do not match, the processor may indicate or initiate a tamper flag, halt current and future operations until otherwise instructed (e.g. factory reset, servicing, etc.), or permanently disable the device.

In some situations, non-tampering factors (e.g. mechanical vibrations, changes in temperature, etc.) can cause one or more of the TDDs 403 to produce noisy information (e.g. variations in a tamper value). For example, the tamper value of one or more of the TDDs 403 can change when a screw (not shown) is dislodged, which can result in a mismatch with the preset tamper values stored in the memory 422. However, a fuzzy extractor circuit or device may be included in the system 400; such a fuzzy extractor can help determine or correct for situations when non-tampering factors have caused a change in a tamper value. A fuzzy extractor can generate a nearly uniform random string from sources (e.g. tamper values) that may not be uniformly distributed or reliably reproducible. For example, a fuzzy extractor can generate a random string that does not change even though minor changes in the tamper value (e.g. due to mechanical vibrations) may have occurred, which can build robustness into the system while maintaining security. In other words, a fuzzy extractor device can convert a noisy non-uniform input (e.g. from a TDD 403) into a reliably reproducible, uniformly random string by extracting the uniformly random string from the noisy non-uniform input in a noise-tolerant way. Noise-tolerant means that if the input changes but remains close to the original input, the uniformly random string can be reproduced exactly. Although, if the input changes beyond an amount attributable to mere noise, the uniformly random string will vary. To determine whether a tamper event has occurred, the uniformly random string may be hashed with a key and the result can be compared to a predetermined value stored in the memory 422. If the result matches the predetermined value, no tampering may be indicated; although if the result does not match the predetermined value, tampering may be indicated.

The fuzzy extractor can be a cryptographic device which can be included in the processor 420 or integrated into an SOC. In some examples, the fuzzy extractor may be located between the ADCs 401, 402, 410, or 406, and the registers 404, 408, 414, or 416. In other examples, the fuzzy extractor may be located between the TDDs 403 and the ADCs 401, 402, 410, or 406.

Figure 5:
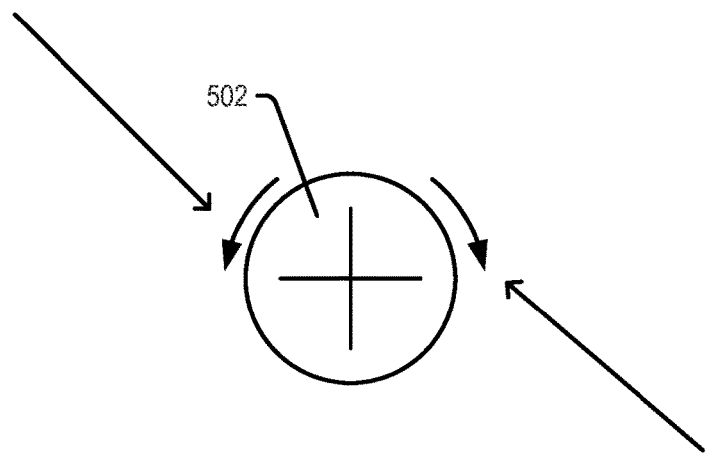
FIG. 5 is a system of tamper evident detection, in accordance with certain embodiments of the present disclosure.

Referring to FIG. 5, a system of tamper evident detection is shown and is generally designated 500. The system 500 can be an embodiment of systems 300 and 400, and can include a screw 502 coupled to a TDD (as described in FIG. 3). In some examples, the screw may have a flathead interface, a hex (e.g. allen) wrench interface, a socketed interface, or other interface, or any combination thereof. The screw 502 can both secure the PCB (as described in FIG. 3) to a chassis, frame, or other PCB, or any combination thereof, and may also be coupled to a variable resistor. In some embodiments, the screw 502 may be coupled to a center tap of a variable resistor; when the measured resistance of the variable resistor can change as the screw 502 is turned.

Tamper values can increase and decrease at different change rates depending on the physical changes to the system. For example, the tamper value of TDD 303 may increase by one for a clockwise one tenth turn of the screw, but may decrease by three for a counter clockwise one tenth turn of the screw. The change in tamper value may be expressed as $\Delta Tamper\_Value = Changerate \times \Delta Position$. The difference between the incrementing and decrementing change rates can make it more difficult for a would-be tamperer to defeat the detection circuitry simply by returning the screw to its original position. Further, the change rates may not be linear.

The tamper value change rates listed in the embodiment of system 500 are but one example; the rate of change may be higher for incrementing the tamper value than for decrementing, or higher for decrementing the tamper value than incrementing, or may be zero. For example, the rate of change for a counter clockwise turn may be one per quarter revolution, but the change rate of a clockwise turn may be zero; that is, once a screw is turned counter clockwise (e.g. removing the screw), the tamper value may not be restored by the tamperer.

Figure 6:
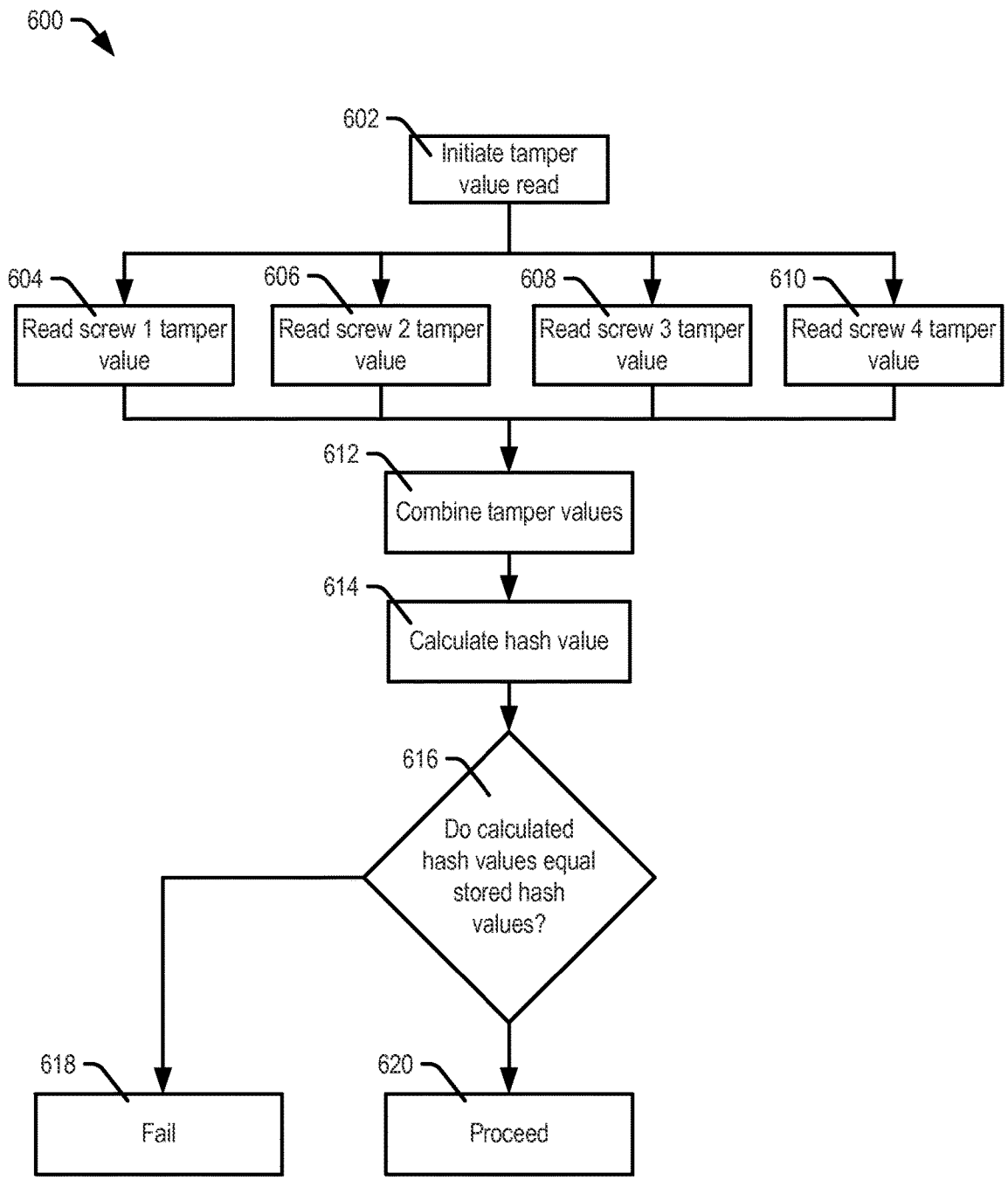
FIG. 6 is a flowchart of a method of tamper evident detection, in accordance with certain embodiments of the present disclosure.

Referring to FIG. 6, a flowchart of a method of tamper evident detection is shown and is generally designated 600. The method 600 can be an implementation of systems 100, 200, 300, 400, and 500. An initiate tamper value read instruction may be received at 602. The instruction may come from a circuit, firmware, software, or other source, or may be initiated by a control circuit, such as the control circuit 104. The instruction may be prompted by an event (e.g. system startup, reboot, etc.), the expiration of a timer, periodic checks, another trigger, local or remote user commands, and so forth. One or more tamper values may be provided from a TDD to a control circuit at 604, 606, 608, and 610. The provided tamper values can be combined (e.g. concatenated, added, subtracted, etc.) at 612, although in some examples, the tamper values may not be combined and could be analyzed separately.

The tamper values, combined or not, may be encrypted (e.g. via a hashing function) at 614, then compared to a preset tamper value stored a memory, such as the memory 108, at 616. In some embodiments, a processor, such the processor 106, may hash the tamper value, although other circuits or firmware can perform the hashing. When the tamper values provided by the TDDs do not substantially match the preset value, the control circuit may prevent access to the stored data; the sensitivity of the circuits, including processors and TDDs, may be adjustable. In some embodiments, the control circuit can destroy or otherwise render an encryption key unusable, physically destroy the data (e.g. degaussing), or may enter a fail state at 618, or any combination thereof. A fail state can be when the processor or controller halts a current operation and disables the system for future operations due to a tamper event, although the fail state may be different in different embodiments. When the TDD tamper values are substantially equal to the preset tamper value, the control circuit may allow the current operation to continue without prohibiting future operations.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a tamper detection circuit device (TDD) including a variable resistance responsive to a screw, the variable resistance configured to change at a different rate when the screw is turned clockwise versus counter clockwise such that when the screw is turned one of clockwise or counter clockwise from a first position at which the variable resistance has a first variable resistance value to a second position and the screw is then turned back to the first position, the variable resistance has a second variable resistance value that is different from the first variable resistance value;
    a circuit coupled to the TDD and configured to:
        determine a tamper value from the TDD based on the variable resistance; and
        disable a function of the apparatus based on the tamper value.

2. The apparatus of claim 1 comprising the circuit further configured to:
    measure a tamper value from each of one or more tamper detection circuit devices (TDDs);
    compare the one or more tamper values with preset tamper values stored in a first memory; and
    disabling access to stored data when at least one of the one or more tamper values does not equal a corresponding preset tamper values.

3. The apparatus of claim 2 comprising the circuit further configured to:
    convert the one or more tamper values to one or more digital values; and
    compare the digital values of the one or more TDDs to one or more preset tamper values corresponding to the respective tamper detection device.

4. The apparatus of claim 3 comprising the circuit further configured to:
    combine the one or more digital values to produce a combined tamper value.

5. The apparatus of claim 4 comprising the circuit further configured to:
    concatenate the one or more digital values by shifting a digital value by N×(T−1) bits, where N is a number of storage bits in the digital value, and T is the number of remaining unshifted digital values, inclusive.

6. The apparatus of claim 4 comprising the circuit further configured to:
    compare the combined tamper value with a preset tamper value; and
    destroy an encryption key when the combined tamper value does not equal the preset tamper value.

7. The apparatus of claim 4 comprising the circuit further configured to:
    compare the combined tamper value with a preset tamper value; and
    physically destroy data on a data storage device when the combined tamper value does not equal the preset tamper value.

8. A system comprising:
    at least one tamper detection circuit device (TDD) including a screw fastening mechanism adjustable in first and second directions, the fastening mechanism including a circuit configured to vary a variable resistance when the screw fastening mechanism is turned, the TDD associated with a tamper value and configured to change the tamper value at a different rate when the screw fastening mechanism is adjusted in the first direction versus the second direction such that when the screw fastening mechanism is turned in one of the first or second directions from a first position at which the tamper value is a first value to a second position and the screw fastening mechanism is then turned back to the first position, the tamper value has a second value that is different from the first value;

a processor coupled to the TDD and configured to compare the tamper value to a preset value stored in a first memory.

9. The system of claim 8 further comprising:

at least one converter circuit coupled to the at least one tamper detection device and a memory, and configured to convert a tamper value of the at least one tamper detection device to a digital value acceptable to the processor.

10. The system of claim 8 further comprising:

a fuzzy extractor coupled to the at least one TDD and to the processor, and configured to convert a noisy non-uniform input into a reliably reproducible, uniformly random string by extracting the uniformly random string from the noisy non-uniform input in a noise-tolerant way.

11. The system of claim 8 further comprising:

a printed circuit board (PCB) affixed to a frame including:

the at least one tamper detection device;

the at least one converter circuit;

at least one first memory; and the processor.

12. The system of claim 11 further comprising the at least one tamper detection device is coupled to the at least one converter circuit.

13. The system of claim 12 further comprising:

the connected screw is configured to secure two or more physical pieces together; and the tamper value changes at the different change rate when the screw is turned clockwise as opposed to counter clockwise.

14. A method comprising:

determining one or more tamper values from an output of each of one or more tamper detection devices (TDDs);

converting the one or more tamper values to one or more digital values;

combining the one or more digital values to produce a combined tamper value by concatenating the one or more digital values by shifting a digital value by N×(T−1) bits, where N is a number of storage bits in the digital value, and T is the number of remaining unshifted digital values, inclusive; and disabling a function of a device corresponding to the TDDs based on comparing the digital values to one or more predetermined tamper values.

15. The method of claim 14 further comprising:

providing the one or more tamper values to a processor via a first memory upon receipt of an indicator.

16. The method of claim 14 further comprising:

comparing the combined tamper value with a preset tamper value via the processor;

halting current operations and prohibiting future operations when the calculated tamper value does not equal the stored tamper value; and proceeding with operations when the calculated tamper value equals the preset tamper value.

17. The method of claim 14 further comprising:

calculating a hash value in the processor based on the combined tamper value;

determining if a device has been tampered with by comparing the calculated hash value to a preset hash value stored in a second memory;

halting current operations and prohibiting future operations when the calculated tamper value does not equal the stored tamper value; and proceeding with operations when the calculated tamper value equals the stored tamper value.

* * * * *